US006717367B2

(12) United States Patent
Tabell

(10) Patent No.: US 6,717,367 B2
(45) Date of Patent: Apr. 6, 2004

(54) EMERGENCY LIGHTING ARRANGEMENT AND APPARATUS

(75) Inventor: Jari Tabell, Lahti (FI)

(73) Assignee: Teknoware Oy, Lahti (FI)

( * ) Notice: Subject to any disclaimer, the term of this patent is extended or adjusted under 35 U.S.C. 154(b) by 0 days.

(21) Appl. No.: 10/190,135

(22) Filed: Jul. 3, 2002

(65) Prior Publication Data
US 2003/0006709 A1 Jan. 9, 2003

(30) Foreign Application Priority Data

Jul. 4, 2001 (FI) .............................. 20011463

(51) Int. Cl.⁷ .............................................. H05B 37/00
(52) U.S. Cl. ........................... 315/86; 315/87; 315/131; 315/DIG. 4; 315/307
(58) Field of Search ............................... 315/86, 87, 88, 315/89, 1, 91, 92, 93, DIG. 4, 129, 131, 200 R, 291, 307

(56) References Cited

U.S. PATENT DOCUMENTS

| 3,869,639 A | 3/1975 | Herzog | 315/86 |
| 4,454,452 A * | 6/1984 | Feldstein | 315/86 |
| 4,977,351 A | 12/1990 | Bavaro et al. | 315/87 |
| 5,214,352 A | 5/1993 | Love | 315/86 |
| 5,646,486 A * | 7/1997 | Edwards et al. | 315/86 |
| 6,045,232 A * | 4/2000 | Buckmaster | 362/20 |
| 6,049,178 A * | 4/2000 | Sheu et al. | 315/291 |

FOREIGN PATENT DOCUMENTS

| EP | 0534793 A | 3/1993 |
| EP | 1202428 A | 5/2002 |
| GB | 2253077 A | 8/1992 |
| GB | 2303978 A | 3/1997 |
| WO | 0027013 A1 | 5/2000 |

* cited by examiner

Primary Examiner—Tuyet T. Vo
(74) Attorney, Agent, or Firm—Leydig Voit & Mayer Ltd

(57) ABSTRACT

An emergency lighting arrangement and an emergency lighting apparatus, the arrangement being configured to be coupled to a supply network and the arrangement comprising an electronic ballast for igniting and burning a fluorescent lamp, the emergency lighting apparatus comprising a battery (Batt), recharge device (3) for recharging the battery from the supply network, a supply device (4) for supplying the battery voltage further, and a control unit (B), which is configured to control the devices of the emergency lighting apparatus. The electronic ballast of the emergency lighting system is a controllably dimmable ballast, and the emergency lighting apparatus further comprises a dimming control unit (C) for controlling the dimming of the electronic ballast.

14 Claims, 3 Drawing Sheets

EMERGENCY LIGHTING ARRANGEMENT AND APPARATUS

BACKGROUND OF THE INVENTION

The present invention relates to an emergency lighting arrangement configured to be connected to a supply network, comprising: an electronic ballast for igniting and burning a fluorescent lamp, and to an emergency lighting apparatus, comprising: a battery, a recharging device for recharging the battery from the supply network, a supply device for supplying the battery voltage further, and a control unit configured to control the devices of the emergency lighting apparatus.

Emergency lighting is installed in public buildings and other public premises to secure at least minimum lighting in the case of a disturbance or a power failure in the supply network. The aim of emergency lighting is to illuminate specific premises according to regulations to allow safe exit from the premises, for example, when the supply network malfunctions due to network failure, for example. Emergency lighting can be implemented using lighting devices designed for normal general lighting and provided with an emergency lighting apparatus. Emergency lighting apparatuses are placed in connection with those lighting devices that are to produce the emergency lighting.

Currently known, separately placed emergency lighting apparatuses comprise a recharging device, a battery, an electronic ballast, and a power supply exchanger for a fluorescent lamp. The principle of operation is that under normal circumstances, i.e. when mains voltage is on, the emergency lighting apparatus recharges the battery, and the fluorescent lamp is operated either by a magnetic choke or an electronic ballast. A power failure causes an internal ballast provided in the emergency lighting apparatus to switch on, and the power supply exchanger coupled to the lighting apparatus wiring connects the fluorescent lamp to the ballast of the emergency lighting apparatus. Due to limited battery capacity, the internal ballast of the emergency lighting apparatus must be dimensioned so that during a power failure it supplies the fluorescent lamp with power producing a lighting intensity that is considerably lower than normal to allow a sufficiently long operating time to be achieved.

A problem with this technology is that the coupling of the power supply exchanger to the lighting apparatus wiring, i.e. the four wires of a fluorescent lamp, renders the wiring complicated as regards installation. Moreover, this sets additional requirements for the power supply exchanger, because it must be capable of sustaining the ignition voltage of the fluorescent lamp, the maximum value of which may be over 1 kW. Further, during a power failure a fluorescent lamp is usually employed without filament voltage, which decreases the service life of the fluorescent lamp.

Current technology enables normal fluorescent lamp to be dimmed by means of specific dimming ballasts. Such ballasts are commercially available, and they allow the current flowing from the ballast to the fluorescent lamp, and thereby the illumination produced by the fluorescent lamp, to be adjusted. When used in connection with general lighting, a dimming ballast is normally used for dimming the lighting.

WO0027013 discloses an emergency lighting apparatus that can be coupled between alternating voltage and the ballast of a fluorescent lamp. When a network failure occurs, the emergency lighting apparatus supplies direct voltage of a predetermined magnitude to the ballast to allow the fluorescent lamp to burn.

BRIEF DESCRIPTION OF THE INVENTION

It is an object of the present invention to provide an emergency lighting arrangement, which avoids the above disadvantages and provides a simple arrangement enabling reliable use of emergency lighting in a manner that allows the service life of the battery capacity of the emergency lighting apparatus to be optimised. This object is achieved by an arrangement of the invention, characterized in that the electronic ballast is a controllably dimmable ballast and that the emergency lighting apparatus further contains means for controlling the dimming of the electronic ballast, which means comprise a battery current determining member, whereby the means for controlling the dimming of the electronic ballast are configured to control the dimming of the electronic ballast in response to the magnitude of the determined current.

The arrangement of the invention is based on the idea that the emergency lighting arrangement is provided with a dimmable electronic ballast and the emergency lighting apparatus is equipped with means for dimming the dimmable ballast. Due to the dimming, the input power of the ballast decreases during a power failure, whereby the emergency lighting apparatus that supplies power to the ballast can be provided with lower battery capacity than before.

The dimming adjustment allows the input power of the ballast to be controlled to an optimal level in relation to battery capacity for the required operating period during power failure. In addition, this characteristic allows one and the same emergency lighting apparatus to be used in connection with lamps of different power levels.

An emergency lighting arrangement based on the same principle of the invention is also applicable in connection with dimmable ballasts of different types.

The invention further relates to an emergency lighting apparatus which is configured to be coupled between a dimmable electronic ballast and a supply network, the emergency lighting apparatus comprising a battery, a recharging device for recharging the battery from the supply network, a supply device for supplying the battery voltage further, and a control unit which is configured to control the devices of the emergency lighting apparatus. The emergency lighting apparatus is characterised in that it further comprises means for controlling the dimming of the electronic ballast.

The emergency lighting apparatus of the invention provides a simple and reliable structure for implementing the advantages of the emergency lighting arrangement. The emergency lighting apparatus of the invention can be connected to commercially available dimmable electronic ballasts.

BRIEF DESCRIPTION OF THE DRAWINGS

In the following, the invention will be described in greater detail with reference to the preferred embodiments and the accompanying drawings, in which.

DETAILED DESCRIPTION OF THE INVENTION

Figure 1:
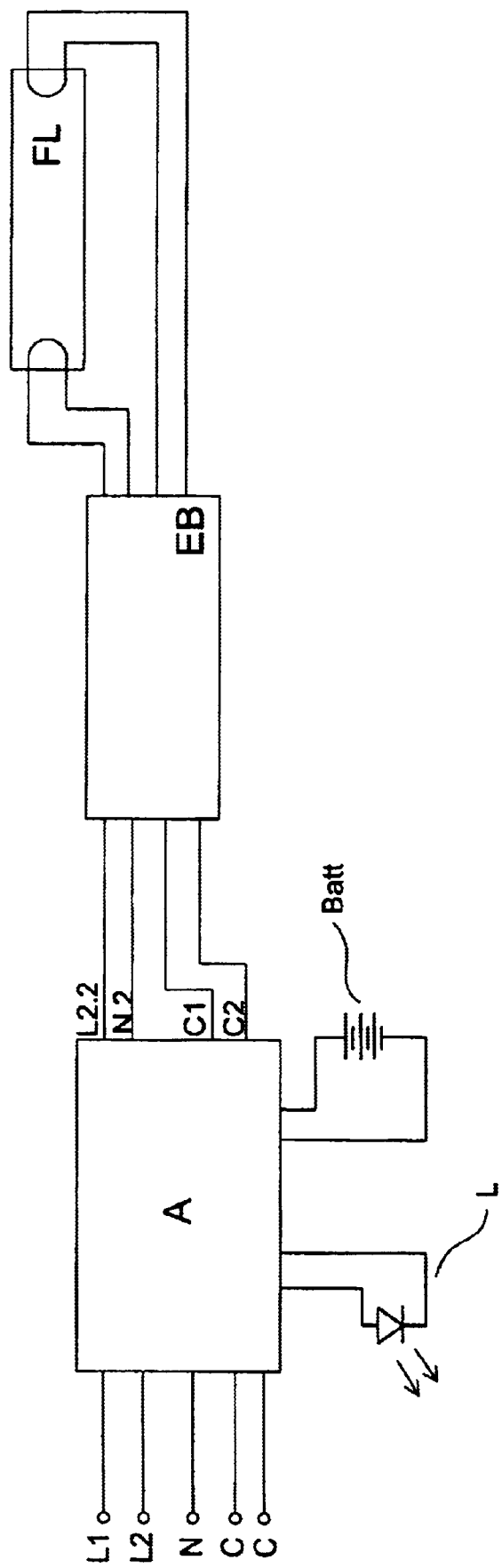
FIG. 1 is a block diagram illustrating an emergency lighting arrangement of the invention.

FIG. 1 is a block diagram of the structure of an emergency lighting arrangement of the invention. The Figure shows the coupling between an emergency lighting apparatus A, an electronic ballast EB, and a fluorescent lamp FL, which receives its power supply from the ballast. The emergency lighting apparatus receives supply L1 directly from the supply network, and supply L2 after a light switch. Also connected to the supply, there is a neutral wire N, which is shared by the supplies L1, L2. A network failure is detected when the direct supply L1 is disconnected. In other words, the switching off of the supply L2 controlled by the light switch does not affect supply L1 or the operation of the emergency lighting apparatus.

FIG. 1 further shows a recharge indicator L and a battery BATT connected to the emergency lighting apparatus A. The recharge indicator provides a visual indication of the operation of the battery circuit of the emergency lighting apparatus and the recharging of the batteries during normal use.

The electronic ballast EB of the emergency lighting arrangement of the invention is a controllably dimmable ballast, the emergency lighting apparatus A comprising means for controlling its dimming. FIG. 1 shows terminations L2.2 and N.2, which form the supply from the emergency lighting apparatus to the electronic ballast. In addition, the Figure shows terminations C1, C2 through which the dimming control means included in the emergency lighting apparatus transmit the dimming information to the ballast. These features of the invention will be described in greater detail in connection with FIGS. 2 and 3. The principle of operation of the apparatus is that when supply L1 breaks off, the emergency lighting apparatus switches to power failure mode in which it supplies power from the battery to the ballast. The emergency lighting apparatus thus controls the ballast to a dimmer lighting level.

Figure 2:
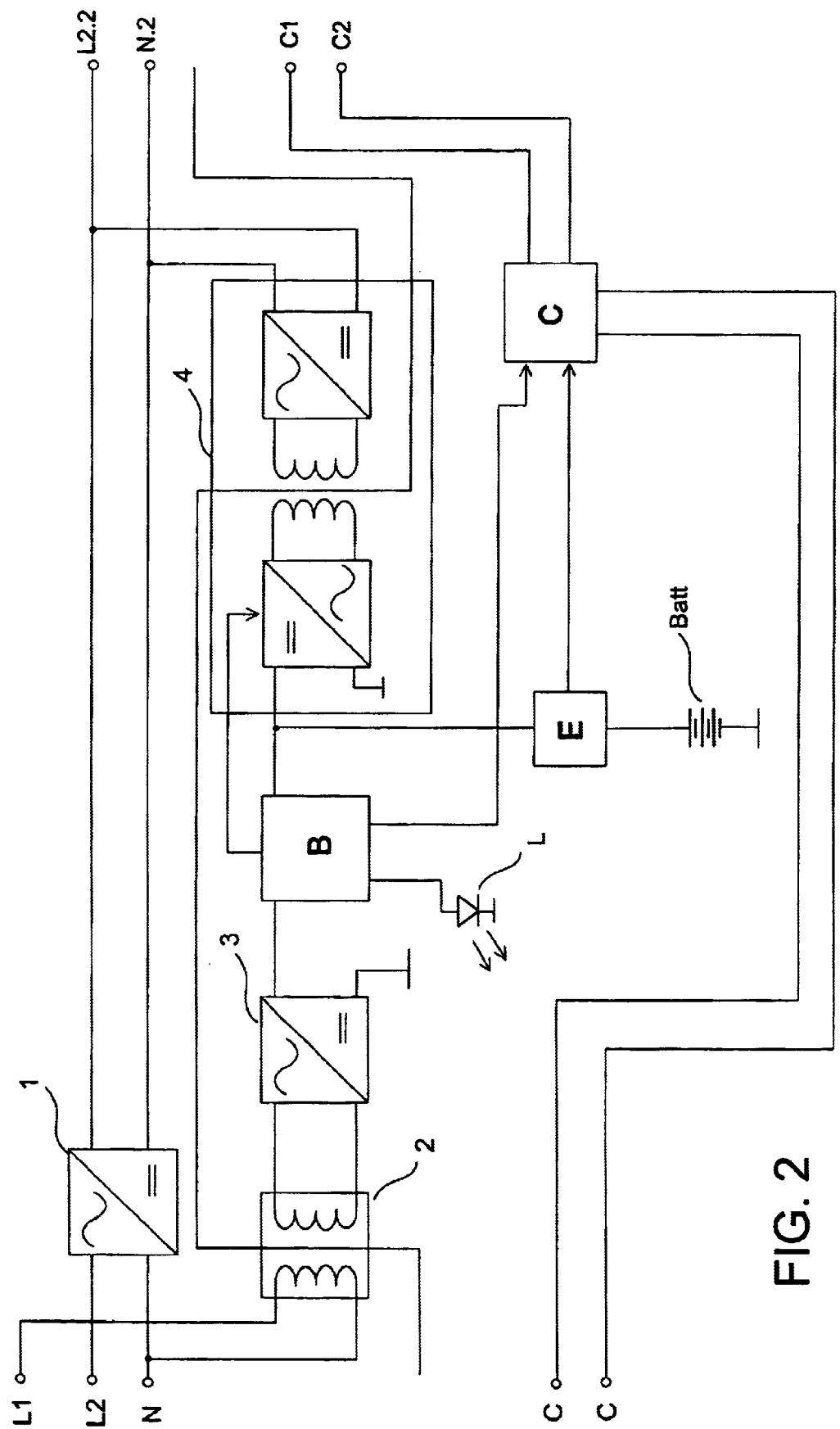
FIG. 2 illustrates an embodiment of an emergency lighting apparatus of an emergency lighting arrangement of the invention in connection with a ballast operated by direct voltage.

FIG. 2 shows an emergency lighting apparatus of the arrangement of the invention, the apparatus supplying direct voltage to the dimmable electronic ballast of the fluorescent lamp during both normal use and power failure. The Figure does not show the actual ballast, but the supply terminations L2.2, N2 and the control terminations C1, C2 to the ballast are shown. In normal use the operating voltage to the ballast is supplied from inputs L2 and N through a rectifier 1 to supply L2.2, N2 of the ballast.

The input L1 is provided with continuous voltage, which is supplied through a network transformer 2 and a rectifier 3 of the emergency lighting apparatus to a control unit B. According to the invention, the control unit B is responsible for controlling the operations of the emergency lighting apparatus and the control of the recharge current of the battery Batt.

Any failure in the supply of the input L1 will be detected by the control unit B, which then switches on the battery of the supply device to ensure further supply of voltage, the supply device in the embodiment of FIG. 2 being a DC/DC converter 4. In this embodiment of the invention the control unit B thus operates as a means for exchanging power supply. The purpose of the converter 4 is to provide a voltage to be supplied to the supply L2.2, N2 of the ballast. In the converter 4, the voltage of the battery Batt is increased to a level that is sufficient for the ballast to keep the fluorescent lamp burning. The magnitude of the battery voltage may be as low as 3.6V, for example, which typically means that the voltage for the ballast must be increased. The Figure further shows a recharge indicator L coupled in connection with the control unit, the indicator being for example a light diode emitting light which indicates the working condition of the recharge and battery circuit.

The emergency lighting arrangement of the invention further comprises means C for controlling the dimming of the electronic ballast, i.e. a dimming control unit. At the same time when switching on the DC-DC converter 4 in connection with a failure in network supply, the control unit B commands the dimming control unit C to provide the ballast with an appropriate power level. The output of the unit C is directly connectable to the control terminations C1, C2, which thus control the power of the ballast and, thereby, the illumination intensity of the fluorescent lamp connected to the ballast. The output of the unit C may be a direct voltage message, for example, which the ballast interprets, in a manner known per se, as a dimming instruction.

The dimming control unit is further provided with a connection from inputs C, C, that can be used for dimming the ballast during normal use. The unit is implemented such that when failure mode is assumed the controls provided by the control unit B bypass the controls applied during normal use.

According to a preferred embodiment of the invention, the emergency lighting arrangement further comprises a battery power determining member E implemented in the form of a current-measuring circuit, for example. The current-measuring circuit E indicates the discharge current information of the battery, which is then forwarded to the dimming control unit C. The battery discharge current information allows the unit C to control the ballast to an optimal level in relation to the operating time during a power failure mode. The battery current is used for interpreting the amount of charge remaining in the battery, and, depending on the amount of the charge, the input power of the ballast is adjusted such that the battery capacity will be sufficient for producing illumination for a minimum operating period defined for a power failure mode. The current-measuring circuit is not, however, essential for the operation of the invention, because the control unit C is capable of adjusting the input power of the ballast to a pre-determined, fixed level depending on the battery capacity. Since the input power of the ballast is adjusted, the power of the fluorescent lamp does not affect the operating time.

Figure 3:
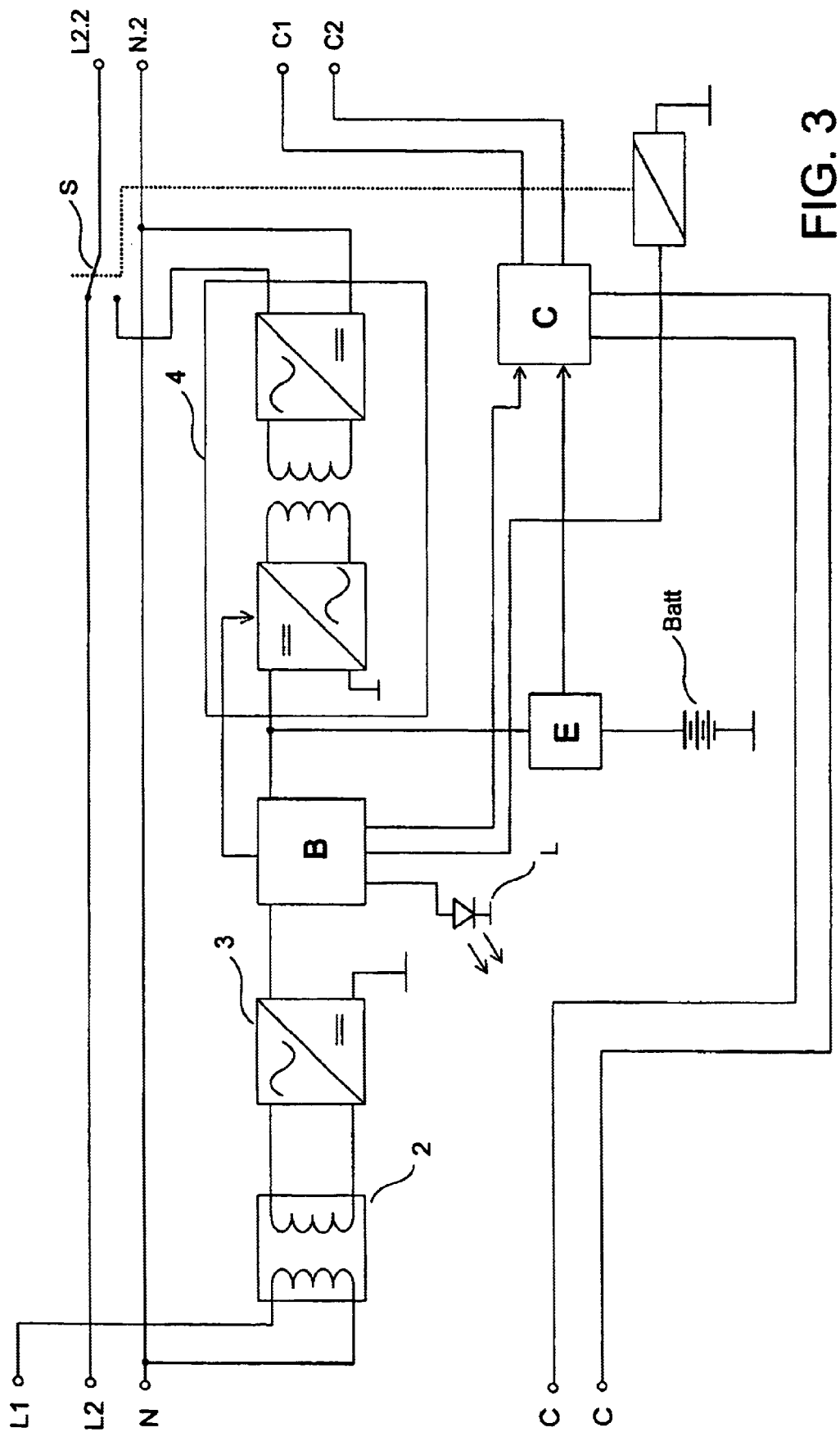
FIG. 3 illustrates an embodiment of an emergency lighting apparatus of an emergency lighting arrangement of the invention in connection with a ballast operated by direct and alternating voltage.

FIG. 3 shows an embodiment of the arrangement of the invention, where the ballast receives an alternating voltage supply in normal use and direct voltage in a failure mode operation. In the embodiment of FIG. 3 the means for exchanging the power supply further comprise a first switching device, which is configured to connect voltage to the ballast supply L2.2 from the supply network or, alternatively, from the supply device 4. The voltage to be supplied from the network to the ballast supply L2.2 is alternating voltage, whereas the voltage to be supplied from the supply equipment is direct voltage.

The first switching device S is controlled by the control unit B such that when the control unit detects a failure in the power supply, the control unit controls the switching device S. In addition, the control unit carries out the same functions as described above. The control is implemented such that the control unit B controls a changing relay R, which in turn controls the switching device S as described above. In other respects the switching operation shown in FIG. 3 corresponds to the operation described in connection with FIG. 2.

It is apparent to a person skilled in the art that the basic idea of the invention may be implemented in various ways. The invention and its embodiments are thus not restricted to the above examples, but they may vary within the scope of the claims.

What is claimed is:

1. An emergency lighting arrangement configured to be connected to a supply network and utilized in connection with a fluorescent lamp, the emergency lighting comprising
an electronic ballast for igniting and burning the fluorescent lamp, the electronic ballast being a controllably dimmable ballast, and
an emergency lighting apparatus including a battery, a recharging device adapted to recharge the battery from the supply network, a supply device adapted to supply a battery voltage, a control unit configured to control the emergency lighting apparatus, and means for controllably dimming the electronic ballast, which means comprise a battery current determining member adapted to determine a magnitude of a current, such that the means for controllably dimming the electronic ballast is configured to controllably dim the electronic ballast in response to the magnitude of the determined current.

2. The emergency lighting arrangement according to claim 1, comprising means for exchanging a supply, the means for exchanging the supply including a first switching device configured to exchange from a network supply to a battery supply in response to a failure in the network supply detected by the control unit.

3. The emergency lighting arrangement according to claim 1, wherein the supply device for supplying the battery voltage is a DC-DC converter.

4. The emergency lighting arrangement of claim 1, wherein the means for controllably dimming the electronic ballast further comprises a battery current determining member which is configured to determine the magnitude of a battery discharge current and to indicate the magnitude of the battery discharge current to the means for controllably dimming the electronic ballast, the means for controllably dimming the electronic ballast being configured to control the dimming of the ballast in response to the magnitude of the battery discharge current.

5. The emergency lighting arrangement according to claim 4 further comprising means for exchanging a supply, the means for exchanging the supply including a first switching device configured to exchange from a network supply to a battery supply in response to a failure in the network supply detected by the control unit.

6. The emergency lighting arrangement of claim 1, wherein the control unit is further configured to detect a failure in a supply of a supply network and to control the supply device for supplying battery voltage to the ballast and to the means for controllably dimming the electronic ballast.

7. The emergency lighting arrangement of claim 6, wherein the means for controllably dimming the electronic ballast further comprises a battery current determining member which is configured to determine the magnitude of a battery discharge current and to indicate the magnitude of the battery discharge current to the means for controllably dimming the electronic ballast, the means for controllably dimming the electronic ballast being configured to control the dimming of the ballast in response to the magnitude of the battery discharge current.

8. The emergency lighting arrangement according to claim 6, comprising means for exchanging a supply, the means for exchanging the supply including a first switching device configured to exchange from a network supply to a battery supply in response to a failure in the network supply detected by the control unit.

9. The emergency lighting arrangement according to claim 6, wherein the supply device for supplying the battery voltage is a DC-DC converter.

10. An emergency lighting device configured to be coupled between a supply network and an electronic, dimmable ballast of an emergency lighting apparatus having at least one device, the emergency lighting device including a battery, a recharging device for recharging the battery from the supply network, a supply device for supplying a battery voltage, a control unit configured to control the devices of the emergency lighting apparatus and means for controllably dimming the electronic ballast,
wherein the means for controllably dimming the electronic ballast further comprises a battery current determining member configured to determine a magnitude of a battery discharge current and to indicate the magnitude of the current to the means for controllably dimming the electronic ballast, the means for controllably dimming the electronic ballast being configured to control dimming of the ballast in response to the magnitude of the battery discharge current.

11. The emergency lighting device of claim 10, further comprising means for exchanging the supply, the means for exchanging the supply comprising a switching device configured to exchange from a network supply to a battery supply in response to a network supply failure detected by the control unit.

12. The emergency lighting device of claim 11, wherein the supply device is a DC-DC converter.

13. An emergency lighting device configured to be coupled between a supply network and an electronic, dimmable ballast of an emergency lighting apparatus having at least one device, the emergency lighting device including a battery, a recharging device for recharging the battery from the supply network, a supply device for supplying a battery voltage, a control unit configured to control the devices of the emergency lighting apparatus and means for controllably dimming the electronic ballast and means for exchanging the supply, the means for exchanging the supply comprising a switching device configured to exchange from a network supply to a battery supply in response to a network supply failure detected by the control unity
wherein the means for controllably dimming the electronic ballast further comprises a battery current determining member configured to determine a magnitude of a battery discharge current and to indicate the magnitude of the current to the means for controllably dimming the electronic ballast, the means for controllably dimming the electronic ballast being configured to control dimming of the ballast in response to the magnitude of the battery discharge current.

14. An emergency lighting device configured to be coupled between a supply network and an electronic, dimmable ballast of an emergency lighting apparatus having at least one device, the emergency lighting device including a battery, a recharging device for recharging the battery from the supply network, a supply device for supplying a battery voltage, a control unit configured to control the devices of the emergency lighting apparatus and means for controllably dimming the electronic ballast,
wherein the means for controllably dimming the electronic ballast further comprises a battery current determining member configured to determine a magnitude of a battery discharge current and to indicate the magnitude of the current to the means for controllably dimming the electronic ballast, the means for controllably dimming the electronic ballast being configured to control dimming of the ballast in response to the magnitude of the battery discharge current, wherein the supply device is a DC-DC converter.

* * * * *

UNITED STATES PATENT AND TRADEMARK OFFICE
CERTIFICATE OF CORRECTION

PATENT NO. : 6,717,367 B2
DATED : April 6, 2004
INVENTOR(S) : Tabell

It is certified that error appears in the above-identified patent and that said Letters Patent is hereby corrected as shown below:

<u>Title page</u>,
Item [73], Assignee, replace "Teknowara Oy, Lahti (FI)" with -- Teknoware Oy, Lahti (FI) --

Signed and Sealed this

Sixth Day of July, 2004

JON W. DUDAS
*Acting Director of the United States Patent and Trademark Office*